United States Patent [19]

Baba et al.

[11] Patent Number: 4,566,834

[45] Date of Patent: Jan. 28, 1986

[54] AUTOMATIC PALLETIZING SYSTEM

[75] Inventors: Kiyokazu Baba; Shojiro Shirao, both of Komatsu; Kenji Nishida, Matsuto; Hiroshi Kiyosawa, Komatsu all of Japan

[73] Assignee: Kabushiki Kaisha Komatsu Seisakusho, Tokyo, Japan

[21] Appl. No.: 578,764

[22] Filed: Feb. 9, 1984

[30] Foreign Application Priority Data

Feb. 15, 1983 [JP] Japan .................................. 58-22090

[51] Int. Cl.$^4$ .......................................... B65H 31/32
[52] U.S. Cl. ..................................... 414/27; 198/627; 414/110; 414/331
[58] Field of Search ...................... 414/27, 72, 79, 103, 414/107, 110, 331; 198/626, 627, 802

[56] References Cited

U.S. PATENT DOCUMENTS

| | | | |
|---|---|---|---|
| 2,010,732 | 8/1935 | Mandusic | 271/218 |
| 2,205,767 | 6/1940 | Lamb | 271/218 X |
| 3,160,295 | 12/1964 | Roark | 414/331 |
| 3,178,041 | 4/1965 | Wheat | 414/107 |
| 3,240,356 | 3/1966 | Hill | 414/27 |
| 3,343,690 | 9/1967 | Dean | 414/103 X |
| 3,411,641 | 11/1968 | Dean | 414/72 X |
| 3,854,570 | 12/1974 | Kornylak | 198/802 |
| 4,480,953 | 11/1984 | Baba | 414/110 |

FOREIGN PATENT DOCUMENTS 2627717  1/1977  Fed. Rep. of Germany ........ 414/79

Primary Examiner—Leslie J. Paperner
Attorney, Agent, or Firm—Frost & Jacobs

[57] ABSTRACT

An automated apparatus for palletizing panels or the like fabricated by a press which includes an unloading mechanism for unloading panels from a discharging conveyor of the press. The unloading mechanism includes a first carrier slidable horizontally, a second carrier movable up and down relative to the first carrier and a turning arm mounted to the underside of the second carrier and having a plurality of vacuum cups mounted thereto. A pair of latch conveyor mechanisms are provided opposite sides of the unloading mechanism for receiving panels therefrom. Provided below the latch conveyor mechanism is a first pallet which receives pallets from the latch conveyor mechanism or directly from the unloading mechanism. Also provided is a hanger mechanism for receiving panels having openings formed therein from the unloading mechanism.

1 Claim, 13 Drawing Figures

AUTOMATIC PALLETIZING SYSTEM

BACKGROUND OF THE INVENTION

This invention relates to an automatic palletizing system for automatically loading on a pallet panels which are placed on the discharging conveyor of a continuous pressing machine such as, for example, a transfer press and which have been pressed.

Most of palletizing operations have so far been made manually. In these days requiring reduced press cycle time, however, manual loading of panels on a pallet in an orderly manner has posed a problem in that it is difficult and labour-intensive.

SUMMARY OF THE INVENTION

It is therefore an object of the present invention to provide an automated apparatus for palletizing panels or the like which can selectively palletize different shapes of panels with great ease.

In accordance with an aspect of the present invention, there is provided an apparatus for palletizing panels or the like fabricated by a press, comprising: conveyor means for discharging the panels from the press; unloading means for unloading the panels from the conveyor means, said unloading means comprising a first carrier mounted above said conveyor means, said first carrier being horizontally reciprocable between a first position above the discharging end of said conveyor means where unloading of the panels starts and a second position where unloading of the panels completes, a second carrier mounted below said first carrier and movable up and down relative to said first carrier, and a turning arm mounted to the underside of said second carrier for pivotal movement in a vertical direction, said turning arm having panel engaging means mounted thereto; a pair of latch conveyor means provided opposite sides of said unloading means at a position corresponding to the second position of said unloading means, said pair of latch conveyor means being adapted to move towards and away from each other and to receive and hold a plurality of panels with spacings between the panels when moved towards each other; first pallet means provided below said latch conveyor means for receiving the panels therefrom; means for lifting and lowering said first pallet means; hanger means for receiving panels each having an opening formed therein from said turning arm after the panels are oriented vertically by the right angular pivoting of said turning arm from its horizontal position; and second pallet means for receiving the panels with openings from said hanger means.

The above and other objects, features and advantages of the present invention will be readily apparent from the following description taken in conjunction with the accompanying drawings.

DESCRIPTION OF THE PREFERRED EMBODIMENTS

The present invention will now be described in detail below by way of example only with reference to the accompanying drawings.

Figure 1:
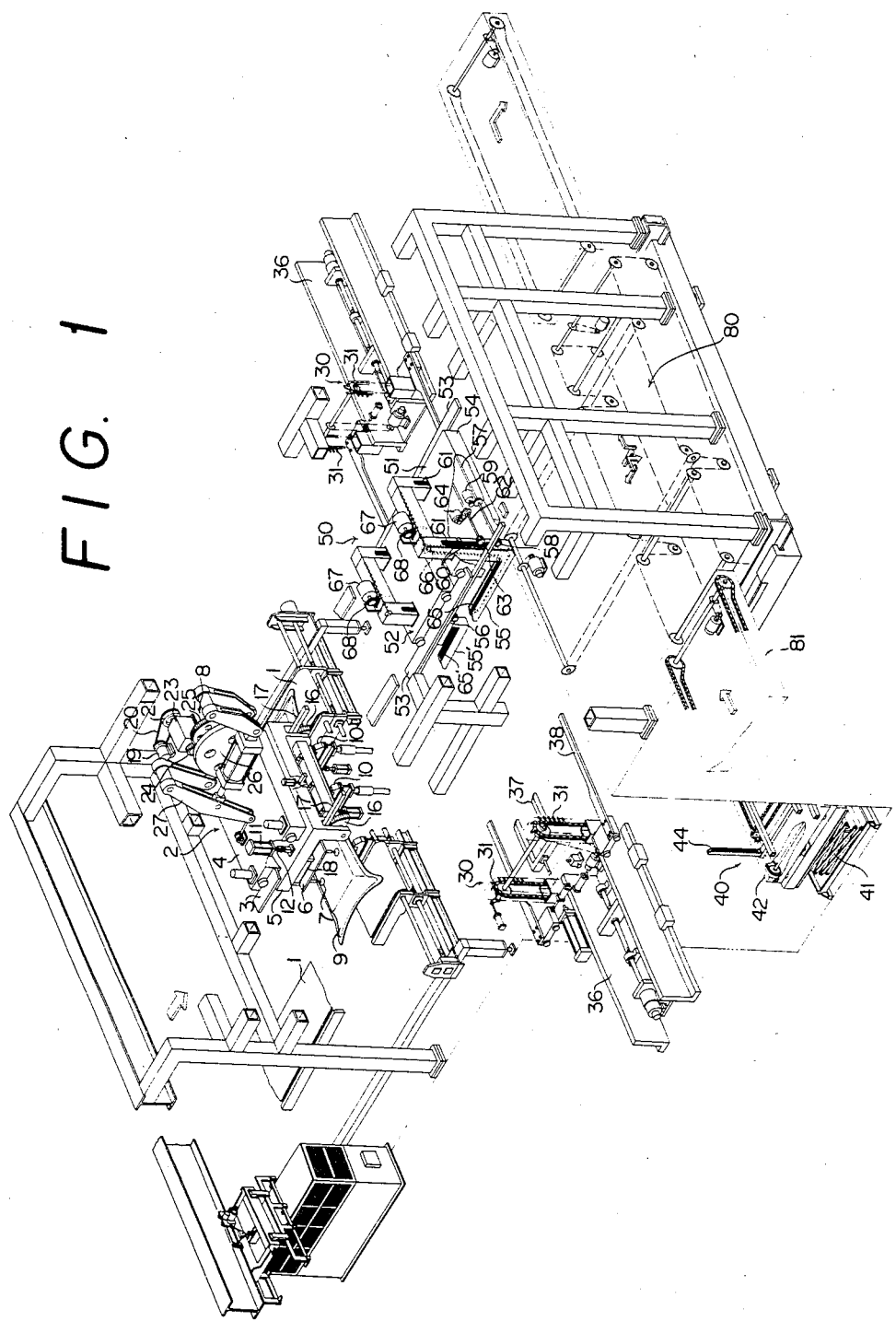
FIG.1 is a schematic perspective view of a palletizing apparatus according to the present invention.
Figure 2:
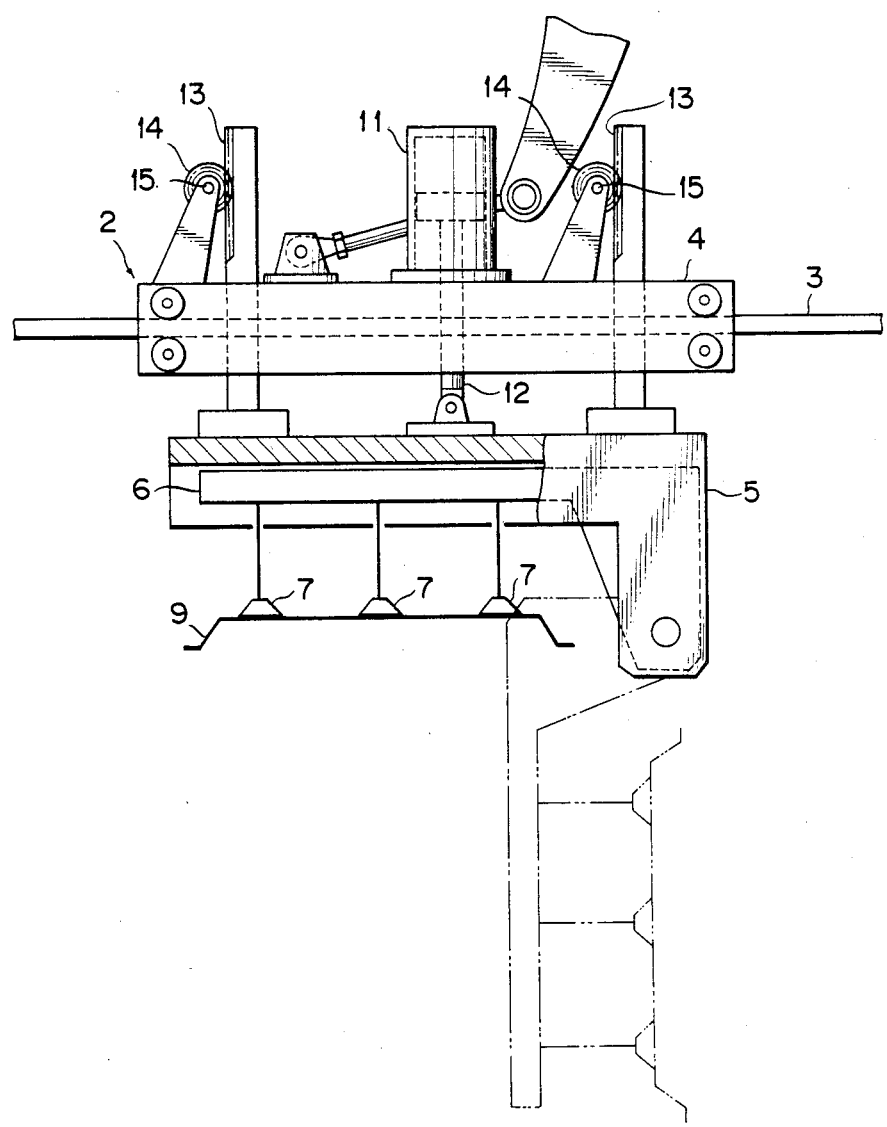
FIG.2 is a schematic side elevation of an unloading carrier employed in the present invention.
Figure 3:
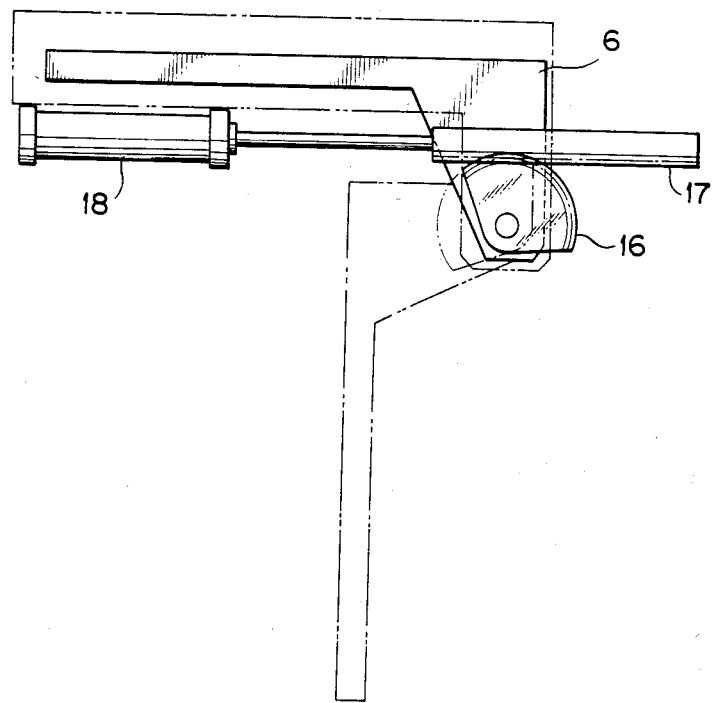
FIG.3 is a side elevation of a turning arm.

In FIG. 1, reference numeral 1 denotes a discharge conveyor connected to the final process of a continuous pressing machine such as a transfer press or the like and 2 an unloading carrier located above the terminal of a path along which the discharge conveyor 1 is conveyed. This unloading carrier is movable from an unloading commencing position above the terminal of the path along which the discharge conveyor 1 is conveyed to an unloading terminating position spaced apart therefrom by a predetermined distance in the direction of movement of the discharge conveyor 1.

In the following description, the direction of movement of the discharge conveyor 1 will be referred to as "direction of unloading".

The above-mentioned unloading carrier 2 comprises, as shown in FIGS. 1 to 4, a running carrier 4 slidably mounted on a frame 3, a vertically movable carrier 5 adapted to move upwards and downwards relative to the running carrier 4, a turning arm 6 whose one end is pivotally mounted on said carrier 5 and which can be turned downwardly over an angle of about 90° from the position which is parallel with said carrier 5, vacuum cups 7 fitted to the lower surface of the turning arm 6, an unloading carrier drive means 8 adapted to reciprocate said running carrier 4, and a panel lifter 10 adapted to lift a panel 9 from the discharge conveyor 1 to the position of the vacuum cups 7 of the unloading carrier 2.

The vertically movable carrier 5 is connected to a piston rod 12 of an air cylinder 11 mounted on the running carrier 4 so that the carrier 5 may be moved vertically by the action of the air cylinder 11. Further, the vertically movable carrier 5 has at four places on the upper surface thereof vertically extending racks 13 which project through the running carrier 4. Each of the racks 13 engages each of pinions 14 supported by the running carrier 4 in such a manner as to rotate synchronously with one another so that the vertically movable carrier 5 may be moved upwards and downwards in parallel relationship with the running carrier 4. Each pair of the above-mentioned pinions 14 are connected by an equalizer shaft 15.

Fixedly secured to the turning central portion of the turning arm 6 is a sector gear 16 which meshes with a rack 17 slidably mounted on the vertically movable carrier 5. This rack 17 is connected to a piston rod of a hydraulic cylinder 18 supported by the carrier 5. The arrangement is made such that extension and contraction of the piston rod of the hydraulic cylinder 18 allow the turning arm 6 to be turned relative to the carrier 5.

Figure 4:
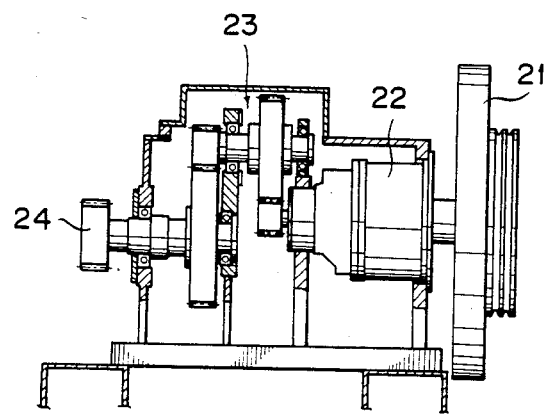
FIG.4 is a cross-sectional view showing reduction gears of an unloading carrier drive means.

Further, the unloading carrier drive means 8 comprises, as shown in FIGS. 1 and 4, a drive motor 19, a flywheel 21 adapted to be driven by way of belt 20 by the drive motor 19, a reduction gear 23 connected through a wet clutch brake 22 to the flywheel 21, a main gear 25 meshing with a pinion 24 of the reduction gear 23, a cam 26 fixedly secured to the shaft of the main gear 25, and an oscillating lever 27 which can be oscillated by the cam 26. The leading end of the oscillating lever 27 is connected through a link to the running carrier 4. The arrangement is made such that rotation of the cam 26 allows the oscillating lever 27 to oscillate in the direction of unloading so that the running carrier 4 may be moved from its unloading commencing position to its unloading terminating position.

Reference numeral 30, 30 denote a pair of latch conveyor means located at the unloading terminating positions and oppositely on both sides of the unloading carrier 2. The latch conveyor means 30, 30 each comprises a pair of latch conveyors 31, 31 and can be moved towards and away from each other.

Figure 5:
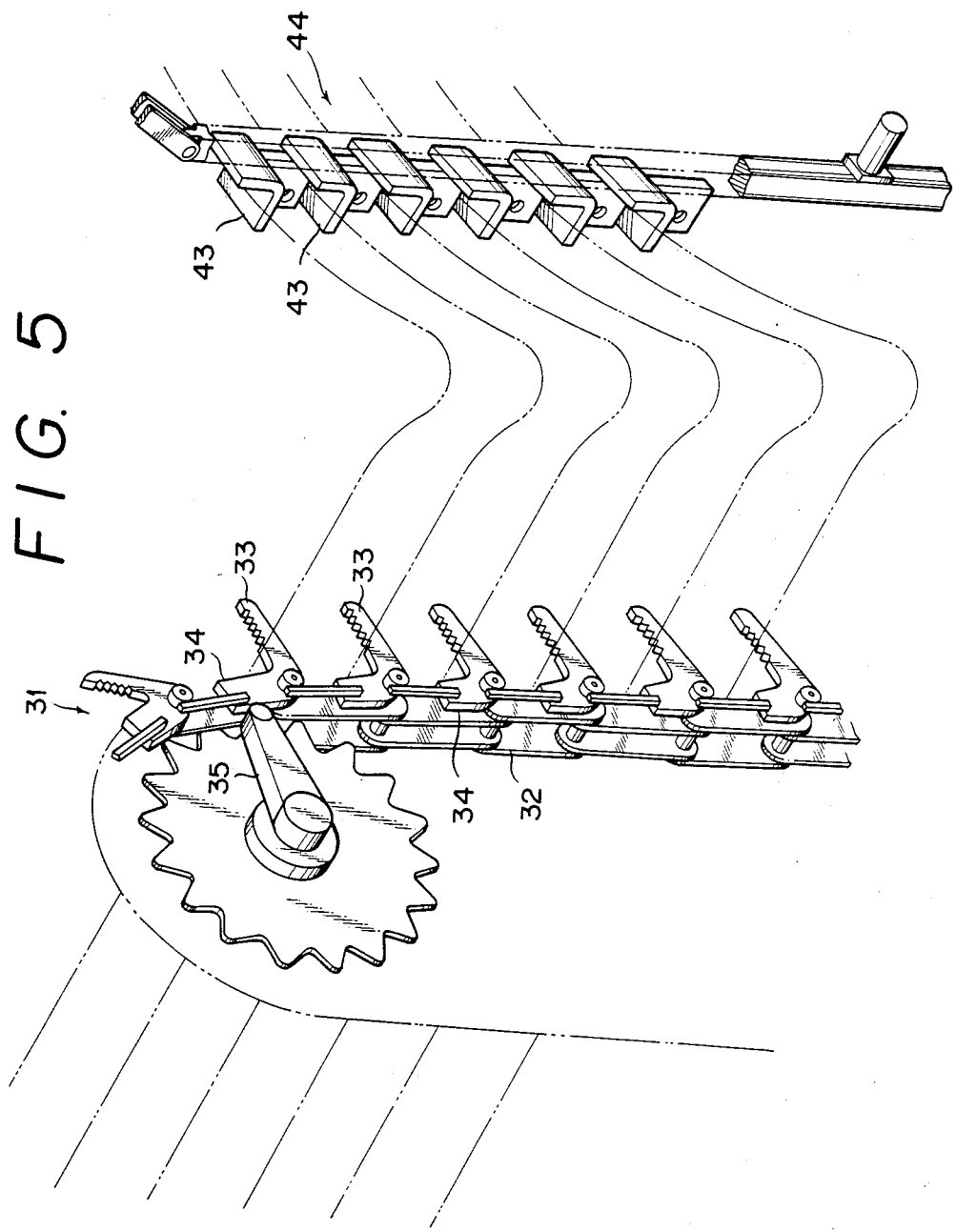
FIG.5 is a schematic perspective view showing, in part, a latch conveyor means and a pallet hook means in a raised position.

As shown in FIG. 5, each of the latch conveyors 31 is arranged such that each of latches 33 is pivotally mounted on each link of a vertically wound latch chain 32 in such a manner that each latch 33 can be pivotted freely from its projected position to its retracted position and is biased by a balance weight 34 mounted at its pivot to the retracted position, the projecting side of each latch 33 being directed to the inside of the unloading terminating position. Reference numeral 35 denotes a knock-out pin fitted to the upper part of each latch conveyor 31 so as to turn freely. This knock-out pin 35 is arranged, when it is turned to the operating position, to abut against the base portion of one latch 33 located in the upper position to allow the latter to assume its projected position. This knock-out pin 35 is arranged to turn simultaneously between each pair of latch conveyors 31. Reference numeral 36 denotes a frame which supports each of the latch conveyors 31, 37 an autofork, and 38 a pallet pusher.

Reference numeral 40 denotes a pallet means mounted under the above-mentioned latch conveyors 30, 30 and which comprises a pallet lifter 41 and a pallet 42 resting thereon. The pallet 42 has pairs of opposed pallet hook members 44 each having a plurality of hooks 43 mounted vertically at the same pitch as that of the latches 33 of the latch conveyor 31. Each pair of pallet hook members 44 can be moved towards and away from each other. The pallet lifter 41 can be moved together with the pallet 42 at the unloading terminating position in a direction at right angles to the direction of unloading.

Reference numeral 50 indicates a hanger means mounted at the unloading terminating position and which is comprised of a main hanger means 51 and a sub-hanger means 52. Regarding the locations of the two hanger means 51 and 52, the sub-hanger means 52 is located closer to the unloading carrier 2 than the main hanger means 51.

The main hanger means 51 is freely movable in the direction of unloading and is comprised of a pair of left and right guide frames 53, 53, a main hanger framework 54 resting on the frames 53, 53, and a pair of L-shaped left and right main hangers 55, 55.

The guide frames 53, 53 for guiding the main hanger framework 54 have respective racks 56, 56 fixedly secured thereto, the racks 56, 56 meshing with left and right pinions 58, 58 rigidly connected to an equalizer shaft 57 mounted on the main hanger framework 54. The arrangement is made such that driving both the pinions 58, 58 by an electric motor 59 provided with a reduction gear enables the main hanger framework 54 to travel in parallel with the direction of unloading.

The pair of left and right main hangers 55, 55 can be moved freely upwards and downwards by the guiding action of a plurality of cam followers 60 mounted on the main hanger framework 54. Fixedly secured to the rear surfaces of the main hangers 55, 55 are racks 61, 61 which mesh with pinions 63, 63 mounted on an equalizer shaft 62. The equalizer shaft 62 is connected to an electric motor 64 provided with a worm reduction gear.

A chain 65 is wound through sprockets on each of the main hangers 55, 55 along the L-shaped configuration of the latter. Upper sprockets 66, 66 on which the chains 65, 65 are wound, respectively, are arranged to be rotated synchronously with each other by an electric motor 67 equipped with a worm reduction gear. The motor 67 is arranged to be driven intermittently under the control of a limit switch 68 thereby enabling the chains 65, 65 to travel intermittently by a predetermined pitch.

The sub-hanger means 52 has the same construction as the aforementioned main hanger means 51. Further, subhangers 55', 55' have shorter horizontal portions than those of the main hangers 55, 55.

The main hanger means 51 and the sub-hanger means 52 are arranged to be actuated synchronously with each other.

Figure 6:
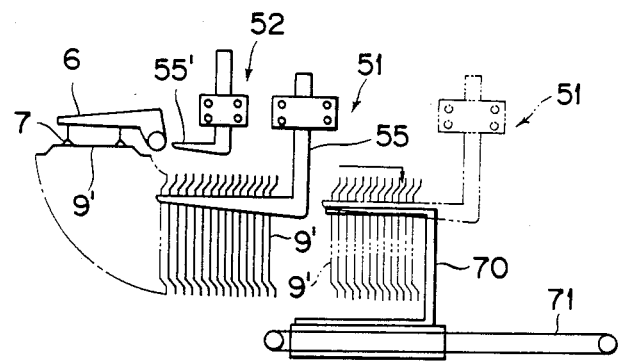
FIGS. 6 to 8 are schematic views explanatory of operation of hanger means.

In brief, both the hanger means 51 and 52 are first advanced to the left in the drawing, and then the main hangers 55, 55 of the main hanger means 51 are lowered. Subsequently, under this condition, perforated panels 9' attracted by the vacuum cups 7 of the unloading carrier 2 are moved in turn along the horizontal portions of the main hangers 55, 55 by the turning movement of the turning arm 6 in such a manner as they assume vertical positions and are pierced by the horizontal portions. At that time, the chains 65, 65 are exposed and extend on the horizontal portions of the main hangers 55, 55 from the leading ends thereof to the trailing ends thereof, and therefore, the panels 9' are allowed to rest on both the chains 65, 65. Further, since the chains 65, 65 are then driven intermittently by a predetermined pitch by means of an indexing mechanism, the panels 9' are loaded in turn further into the main hanger means 51. When it is detected by the indexing mechanism that the main hanger means 51 has been loaded with a predetermined number of panels 9' the main hanger means 51 is moved back to a panel tranship position where the panels 9' are transhipped onto a tranship pallet 70 as shown in FIG 6.

Figure 7:
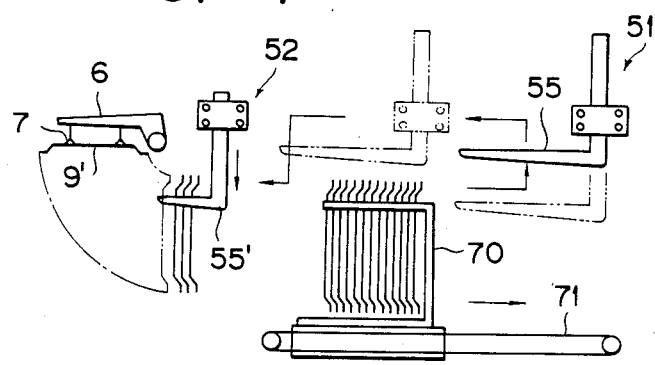

When the main hanger means 51 has been moved back, the sub-hangers 55', 55' of the sub-hanger means 52 which are on stand by are lowered and receive the panels 9' to be fed in turn by the turning movement of the turning arm 6 on the horizontal portions thereof. At that time, as in the case of the main hanger means 51, the panels 9' are moved towards right of the horizontal portions by chains 65', 65' exposed on the upper surfaces thereof and arranged to be driven intermittently by a predetermined pitch. (Refer to FIG 7.)

Whilst, when the panels 9' on the main hanger means 51 have been transferred onto the tranship panel 70, the main hanger means 51 is moved to the right of the pallet 70. Subsequently, the main hangers 55, 55 are moved upwards to a certain level, and then moved leftwards to return to their initial loading positions. (Refer to FIG. 7.)

In the meantime, the tranship pallet 70 is moved to the right by a cross-conveyor means 80.

Figure 8:
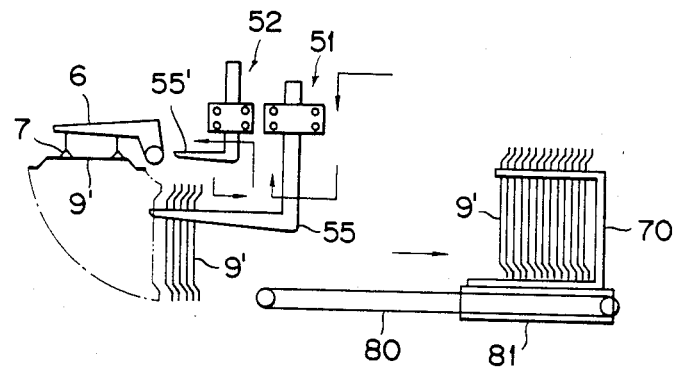

The main hangers 55, 55 of the main hanger means 51 are lowered while returning to the loading positions where the main hangers 55 are thrusted into the holes of the panels 9' loaded on the sub-hangers 55', 55' of the subhanger means 52 to thereby receive the panels 9' from the latter. The sub-hangers 55', 55' whose panels 9' have been transferred onto the main hangers 55, 55 are once moved back to the right, and then moved upwards to a certain height. After that, the sub-hangers 55', 55' will advance to their stand-by positions. (Refer to FIG. 8.)

The panels 9' which have been loaded on the main hangers 55, 55 are moved in turn to the right thereof.

Figure 9:
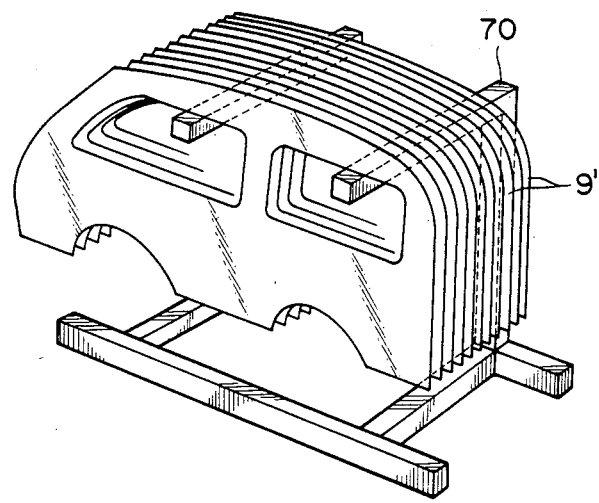
FIG.9 is a perspective view of a pallet loaded with panels having openings formed therein.

When a predetermined number of panels 9' have been loaded thereon, the aforementioned sequence is repeated. The above-mentioned pallet 70 is formed in hanger shape as shown in FIG 9.

Reference numeral 80 denotes a cross-conveyor means on which a cross-pallet 81 rests. The tranship pallet 70 is loaded on the cross-pallet 81. The cross-conveyor means 81 is arranged to reciprocate the cross-pallet 81 in the direction of unloading from the tranship position where panels 9' are transhipped from the main hanger means 51 to the right hand discharge position where the cross-pallet 81 can be moved to the left and to the right. Further, the cross-pallet 81 can be moved upwards to a certain level at the discharge position and then moved to the left and to the right.

The operation of the aforementioned arrangement will now be described below.

(1) Flat Stacking

The panel 9 discharged from the discharge conveyor 1 is lifted by the panel lifter 10 at the terminal of conveying path of the discharge conveyor 1 so that it may be attracted by the vacuum cups 7 of the unloading carrier 2. In this condition, the unloading carrier drive means 8 is actuated to move the unloading carrier 2 in the direction of unloading to the unloading terminal position. In this case, each of the pair of latch conveyors 30, 30 is advanced towards each other beforehand to a predetermined position. Further, the knock-out pins 35 of the latch conveyors 31, 31 are turned in the direction of actuation so as to allow the uppermost latch 33 to assume its projected posture. In this condition, the vertically movable carrier 5 of the unloading carrier 2 that has moved to the unloading terminating position is lowered thus unloading the panel 9 attracted by the cacuum cups 7 onto the projected uppermost latches 33 of the latch conveyors 31, 31. The unloading carrier 2 continues the above-mentioned operation so as to unload the panels 9 discharged by the discharge conveyor 1 in turn onto the latch conveyors 30, 30 located at the unloading terminal position.

Figure 10:
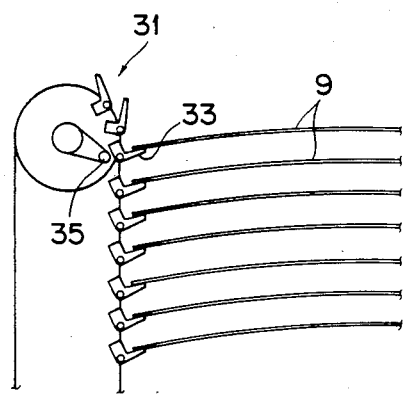
FIGS. 10 to 13 are views explanatory of operations of the latch conveyor means and the pallet hook means.

When the panel 9 is allowed to rest on the latches 33 which have been projected by the knock-out pins 35 of the latch conveyors 31, 31, the latch chains 32, 32 of the latter are moved by one pitch to enable the next latches 33 to be projected by the knock-out pins 35 and the next panel 9 to be lowered thereon. This operation will be repeated in sequence so that panels 9 may be stacked in turn on the inwardly opposed latches 33 as shown in FIGS. 5 and 10.

When the panels 9 whose number is less than a predetermined value by one have been loaded on the latch conveyors 30, 30, the knock-out pins 35 are returned to the retracted positions and the latch chains 32 are moved downwards by one pitch.

Figure 11:
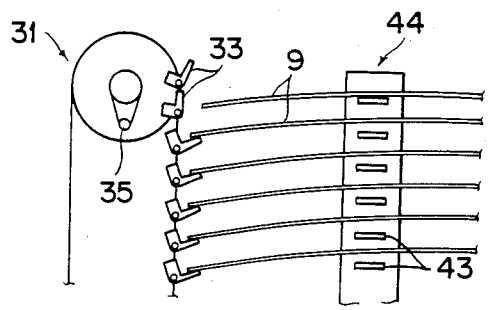

Before or after that time, the pallet lifter 41 is actuated to lift the pallet 42 of the pallet means 40 to allow the pallet hook members 44 upstanding from the pallet 42 to be located oppositely on the side surfaces of the panels 9 stacked on the latch conveyors 31, 31 and then moved towards each thereby enabling each hook 43 to be inserted under each panel 9. (Refer to FIG. 5.) When, under this condition, the last panel 9 among a predetermined number of panels to be unloaded is lowered, the last panel 9 is directly placed on uppermost hooks 43 of the pallet hook members 44. (Refer to FIG. 11.)

Figure 12:
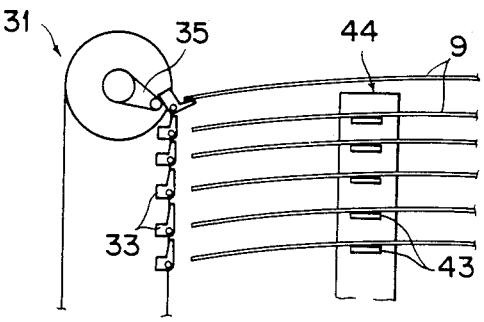

When the knock-out pin 35 is actuated to project the latch 33, and the latch chain 32 is moved by one pitch under this condition, the uppermost latch 33 becomes capable of stacking or loading the next, first panel 9 thereon. Further, the movement of the latch chain 32 of one pitch causes the panel 9 loaded or resting on each of the latches 33 to be transferred onto each of the hooks 43 of the pallet hook member 44. As a result, each of the latches 33 from which the panels 9 have been transferred to the corresponding hooks 43 will be retracted automatically by their respective counterweights 34 as shown in FIG. 12.

Figure 13:
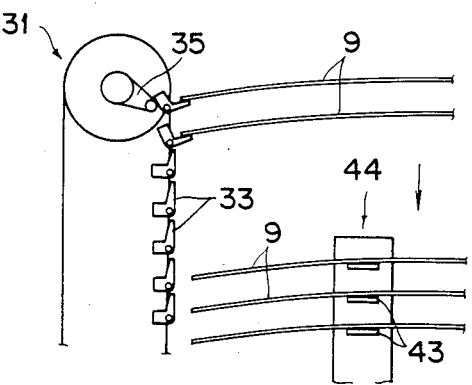

The pallet hook members 44 which have received the panels 9 are lowered and then moved to a predetermined position by running of the pallet 42. During the period, as shown in FIG. 13, the latches 33 of each of the latch conveyors 31, 31 are rendered in turn to be capable of loading the panels 9 by the action of the respective knockout pins 35 so that panels 9 may be loaded in regular sequence thereon.

(2) Flat Stacking by Dropping

The method for moving the panels 9 to the unloading terminating position in this case is the same as in the case of the aforementioned flat stacking. The panels 9 attracted by the vacuum cups 7 are allowed to drop in turn on the pallet 42 at the unloading terminating position so as to stack them on the pallet 42. The height at which the panels 9 are allowed to drop can be kept constant by downwardly inching the pallet lifter 41 from a predetermined height. In this case, it is required to move the pallet hook members 44 away from each other beforehand. When a predetermined number of panels 9 have been stacked thereon, autoforks 37 mounted on the latch conveyor means 30, 30 may advance and receive further panels 9 thereon, while exchange of pallets 42 is made and an empty pallet 42 is placed at the unloading terminating position. The panels 9 received on the autoforks 37 and panels 9 received thereafter are allowed to drop on the empty pallet 42.

(3) Vertical Loading by Thrusting

This loading method is used for perforated panels 9'.

The method for moving the panels 9' to the unloading terminating position is the same as that in the case of the flat stacking. The posture of the panels 9' attracted by the vacuum cups 7 is changed by an angle of 90 degrees by the action of the turning arm 6. After the panels have been turned 90 degrees, they are thrusted by the hanger means 50. Thereafter, the turning arm 6 is returned to its original position and the panels 9' are indexed in turn by the main hanger means 51 so as to be automatically loaded on the latter. When a predetermined number of panels 9' have been loaded on the main hanger means 51, the latter is moved to the right so as to allow the panels 9' to be transhipped onto the tranship pallet 70. The panels 9' to be fed during the transhipment are temporarily pooled on the sub-hanger means 52.

Since the present invention is arranged as mentioned hereinabove, it is possible to conduct selectively flat stacking, flat stacking by dropping and vertical loading by thrusting of large-sized panels discharged through the discharge conveyor 1 from the terminal position of a continuous pressing machine such as a transfer press etc., depending on the kind of the panels so that even if reduced press cycle time is effected the panels can be loaded or stacked automatically and in an orderly manner on the pallets without any need for manual loading.

It is to be understood that the foregoing description is merely illustrative of a preferred embodiment of the present invention and that the present invention is not to be limited thereto, but is to be determined by the scope of the appended claims. What is claimed is:

1. An apparatus for palletizing panels and like flat articles fabricated by a press, comprising:

conveyor means for discharging the panels from the press;

unloading means for unloading the panels from said conveyor means, said unloading means comprising a first carrier mounted above said conveyor means, said first carrier being horizontally reciprocable between a first position have above the discharging end of said conveyor means where unloading of the panels starts and a second position where unloading of the panels is completed, a second carrier mounted below said first carrier and movable up and down relative to said first carrier, and a turning arm mounted to the underside of said second carrier for pivotal movement in a vertical direction, said turning arm panel engaging means mounted thereto;

a pair of latch conveyor means provided on opposite sides of said unloading means at a position corresponding to said second position of said unloading means, said pair of latch conveyor means being adapted to move towards and away from each other and to receive and hold a plurality of panels with spacings between the panels when moved towards each other, each of said latch conveyor means comprising a pair of latch conveyors each including a pair of sprockets, a chain wound around said sprockets, a plurality of latches each movable between a projected position for supporting a panel and a retracted position, means for normally urging said latches to said retracted position, and means for knocking out each of said latches to said projected position;

first pallet means provided below said latch conveyor means for receiving the panels therefrom, said first pallet means comprising two pairs of pallet hook means each comprising a pallet hook member and a plurality of hooks mounted to said pallet hook member, each of said hooks being adapted to support respective panels transferred from said latch conveyor means;

means for lifting and lowering said first pallet means;

hanger means for receiving panels each having an opening formed therein from said turning arm after the panels are oriented vertically by a right angular pivoting of said turning arm from a horizontal position, said hanger means comprising a main hanger and a sub-hanger, both hangers being adapted to move up and down and back and forth and each comprising a pair of L-shaped members and a connection member for coupling said L-shaped members in a spaced relation, each L-shaped member having a chain mounted therein; and second pellet means for receiving the panels with openings from said hanger means.

* * * * *